US011054155B2

(12) United States Patent
Kim

(10) Patent No.: US 11,054,155 B2
(45) Date of Patent: Jul. 6, 2021

(54) RESIN-COATED ALUMINUM PIPE CONNECTOR FOR AIR CONDITIONER OUTDOOR UNIT

(71) Applicant: Hwan Young Kim, Incheon (KR)

(72) Inventor: Hwan Young Kim, Incheon (KR)

( * ) Notice: Subject to any disclaimer, the term of this patent is extended or adjusted under 35 U.S.C. 154(b) by 0 days.

(21) Appl. No.: 17/050,066

(22) PCT Filed: Apr. 11, 2019

(86) PCT No.: PCT/KR2019/004325
§ 371 (c)(1),
(2) Date: Oct. 23, 2020

(87) PCT Pub. No.: WO2019/216558
PCT Pub. Date: Nov. 14, 2019

(65) Prior Publication Data
US 2021/0088234 A1 Mar. 25, 2021

(30) Foreign Application Priority Data

May 9, 2018 (KR) .......................... 10-2018-0052875
Jul. 17, 2018 (KR) .......................... 10-2018-0082891
Mar. 27, 2019 (KR) .......................... 10-2019-0034934

(51) Int. Cl.
*F24F 1/32* (2011.01)
*F16L 19/05* (2006.01)
(Continued)

(52) U.S. Cl.
CPC ................ *F24F 1/32* (2013.01); *F16L 19/04* (2013.01); *F16L 19/05* (2013.01); *F16L 33/24* (2013.01)

(58) Field of Classification Search
CPC ... F24F 1/32; F16L 19/05; F16L 33/24; F16L 19/043; F16L 19/046; F16L 19/04
(Continued)

(56) References Cited

U.S. PATENT DOCUMENTS 2,122,616 A * 7/1938 Lamont ................... F16L 19/05
285/332.2
2,362,686 A * 11/1944 Delano ................... F16L 19/05
285/332.3
(Continued)

FOREIGN PATENT DOCUMENTS

DE 3147050 A1 * 6/1983 ............ F16L 19/043
GB 379031 A * 8/1932 ............ F16L 19/046
(Continued)

*Primary Examiner* — James M Hewitt, II
(74) *Attorney, Agent, or Firm* — KORUS Patent, LLC; Seong Il Jeong

(57) ABSTRACT

Provided herein is a resin-coated aluminum pipe connector for the outdoor unit of an air conditioner. The resin-coated aluminum pipe connector includes: a resin-coated refrigerant pipe made of aluminum, and configured such that an expanded portion is formed at one end thereof; a service valve including a connection port in which a first inclined surface is formed at an end of the connection port and a first screw portion is formed on the outer circumference of the connection port; a first compression ring configured such that an inclined surface is formed at one end of the inner circumference thereof and a first stop protrusion is formed at the other end of the inner circumference thereof; a second compression ring configured such that a second-first inclined surface is formed on the inside thereof and a receiving side wall extends upward from the second-first inclined surface; a sealing material; and a fastener.

1 Claim, 4 Drawing Sheets

(51) Int. Cl.
*F16L 19/04* (2006.01)
*F16L 33/24* (2006.01)

(58) Field of Classification Search
USPC ...................................................... 285/334.5
See application file for complete search history.

(56) References Cited

U.S. PATENT DOCUMENTS 2,511,158 A * 6/1950 Thomasc ............. F16L 27/073
285/272
2012/0175874 A1 7/2012 Newall et al.

FOREIGN PATENT DOCUMENTS

| GB | 807680 A * | 1/1959 | ............ F16L 19/046 |
| KR | 20-2009-0004036 U | 4/2009 | |
| KR | 10-1407491 B1 | 6/2014 | |
| KR | 10-1479288 B1 | 1/2015 | |
| KR | 10-1561257 B1 | 10/2015 | |

* cited by examiner

RESIN-COATED ALUMINUM PIPE CONNECTOR FOR AIR CONDITIONER OUTDOOR UNIT

TECHNICAL FIELD

The present invention relates generally to a pipe connector for the outdoor unit of an air conditioner, and more particularly to a resin-coated aluminum pipe connector for the outdoor unit of an air conditioner, which is intended to connect a refrigerant pipe (referring to a resin-coated aluminum pipe) to a service valve for an outdoor unit in a sealed state by a one-touch method.

BACKGROUND ART

Unless otherwise indicated herein, the content described in this section is not prior art to the claims of this application, and inclusion in this section is not meant to be admitted to be prior art.

In general, to connect various types of pipes, such as refrigerant pipes for an air conditioner and gas pipes, to predetermined mechanical devices, connection structures for pipes are required.

These connection structures for pipes should basically prevent the leakage or seepage of internal fluid, and satisfy conditions such as not being loosened by vibration or external shock.

As an example, in a connection structure for a pipe, an end of the pipe is expanded like a fallopian tube, a nut and a bolt are coupled to each other and tightened in the state in which the expanded portion is interposed therebetween, and the expanded portion comes into close contact with the front end of the bolt, thereby maintaining airtightness.

Although not shown in the drawings, the expanded portion of a pipe (a refrigerant pipe for an air conditioner) and a bolt are connected to each other with a sleeve made of synthetic resin interposed therebetween. At a work site where the pipe is connected, an operator performs fastening by applying force higher than necessary force when performing fastening by fastening a nut and a bolt to each other.

As a result, when the sleeve in contact with the front end of the bolt is subjected to external force higher than necessary force and shape deformation (a crack or distortion), a gap is generated due to the shape deformation, and thus a problem arises in that refrigerant may leak through the gap.

DISCLOSURE

Technical Problem

An embodiment of the present specification is directed to a resin-coated aluminum pipe connector for the outdoor unit of an air conditioner that, when a service valve and a refrigerant pipe are fastened to be connected to each other, may prevent refrigerant from leaking through a gap caused by the damage of the expanded portion of the refrigerant pipe and a compression ring supporting the expanded portion.

An embodiment of the present specification is directed to a resin-coated aluminum pipe connector for the outdoor unit of an air conditioner that enables an operator who has insufficient work experience in connecting a refrigerant pipe to easily connect the refrigerant pipe without damaging the expanded portion of the refrigerant pipe and a compression ring supporting the expanded portion.

An embodiment of the present specification is directed to a resin-coated aluminum pipe connector for the outdoor unit of an air conditioner that may prevent galvanic corrosion attributable to the contact between a compression ring and a refrigerant pipe that are made of heterogeneous materials.

Technical Solution

In order to accomplish the above and other objects of the present specification, according to one embodiment of the present specification, there is provided a resin-coated aluminum pipe connector for the outdoor unit of an air conditioner, the resin-coated aluminum pipe connector including:

a refrigerant pipe made of aluminum, and configured such that an expanded portion is formed at one end thereof;

a service valve including a connection port in which a first inclined surface is formed at an end of the connection port and a first screw portion is formed on the outer circumference of the connection port;

a first compression ring configured such that an inclined surface corresponding to the first inclined surface is formed at one end of the inner circumference thereof and a first stop protrusion is formed at the other end of the inner circumference thereof;

a second compression ring configured such that a second-first inclined surface corresponding to the expanded portion is formed on the inside thereof and a receiving side wall extends upward from the second-first inclined surface;

a sealing material configured such that a second stop protrusion corresponding to the first stop protrusion is formed on the outer circumference thereof, the lower end thereof is received inside the receiving side wall, the gap between the contact surfaces of the first and second compression rings is sealed, and the sealing material prevents the first and second compression rings and the expanded portion of the refrigerant pipe from coming into contact with each other; and a fastener configured such that a second screw portion corresponding to the first screw portion is formed on the entrance side of the inner circumference thereof and a seating portion, inside which the first and second compression rings are seated, is formed beneath the second screw portion.

In order to accomplish the above and other objects of the present specification, according to another embodiment of the present specification, there is provided a resin-coated aluminum pipe connector for the outdoor unit of an air conditioner, the resin-coated aluminum pipe connector including:

a refrigerant pipe made of aluminum;

a service valve including a connection port configured such that a first stop protrusion is formed outside a center through hole, an inclined surface is formed at the outer end of the first stop protrusion, a second stop protrusion is formed on the outer end of the inclined surface, and a first screw portion is formed on the outer circumference thereof;

a first compression ring configured such that an inclined surface corresponding to the inclined surface of the service valve is formed at one end of the outer circumference thereof and the first compression ring seals the gap between the refrigerant pipe and the connection port when compressed;

a second compression ring configured such that a stop protrusion on which the first compression ring is seated is formed on the inner circumference thereof, a pressing piece is formed beneath the stop protrusion and is elastically deformed in the radial direction of the refrigerant pipe when compressed to prevent the refrigerant pipe from being separated, and the upper end of the second compression ring is seated on the second stop protrusion of the service valve; and a fastener configured such that a second screw portion corresponding to the first screw portion is formed on the entrance side of the inner circumference thereof, a through hole through which the refrigerant pipe passes is formed thorough the center thereof, and an inclined surface corresponding to the inclined surface of the second compression ring is formed at the inner end of the through hole.

Advantageous Effects

The resin-coated aluminum pipe connector for the outdoor unit of an air conditioner according to the embodiment of the present specification, which is configured as described above, has the following advantages:

When the fastener is screwed to connect the service valve and the refrigerant pipe, the expanded portion of the refrigerant pipe and the compression ring supporting the expanded portion are prevented from being fastened and thus damaged by excessive pressure, thereby preventing refrigerant from leaking through a gap.

Furthermore, even a non-professional who has insufficient experience in connecting the refrigerant pipe may easily perform connection without damaging the expanded portion of the refrigerant pipe and the compression ring supporting the expanded portion, thereby improving workability.

Moreover, galvanic corrosion may be prevented by blocking the compression ring made of brass and the refrigerant pipe made of aluminum, which are made of heterogeneous materials, from coming into contact with each other, thereby extending service life.

DESCRIPTION OF REFERENCE SYMBOLS OF IMPORTANT PARTS IN THE DRAWINGS

Figure 1:
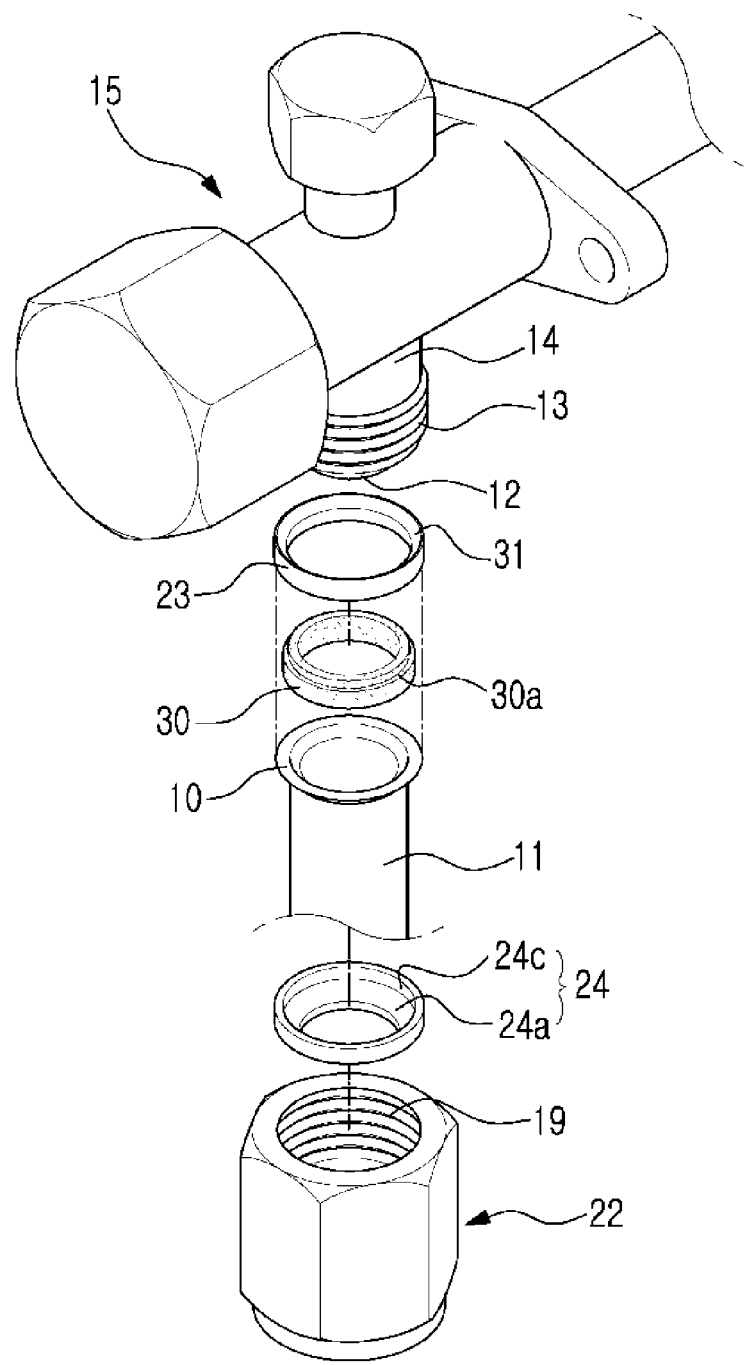
FIG. 1 is a schematic diagram of a resin-coated aluminum pipe connector for the outdoor unit of an air conditioner according to a preferred embodiment the present specification.

10: expanded portion
11: refrigerant pipe
12: first inclined surface
13: first screw portion
14: connection port
15: service valve
18: second compression ring
22: fastener
23: first compression ring
24: second compression ring
25: sealing material

BEST MODE

Resin-coated aluminum pipe connectors for the outdoor unit of an air conditioner according to preferred embodiments of the present specification will be described in detail below with reference to the accompanying drawings.

Figure 2:
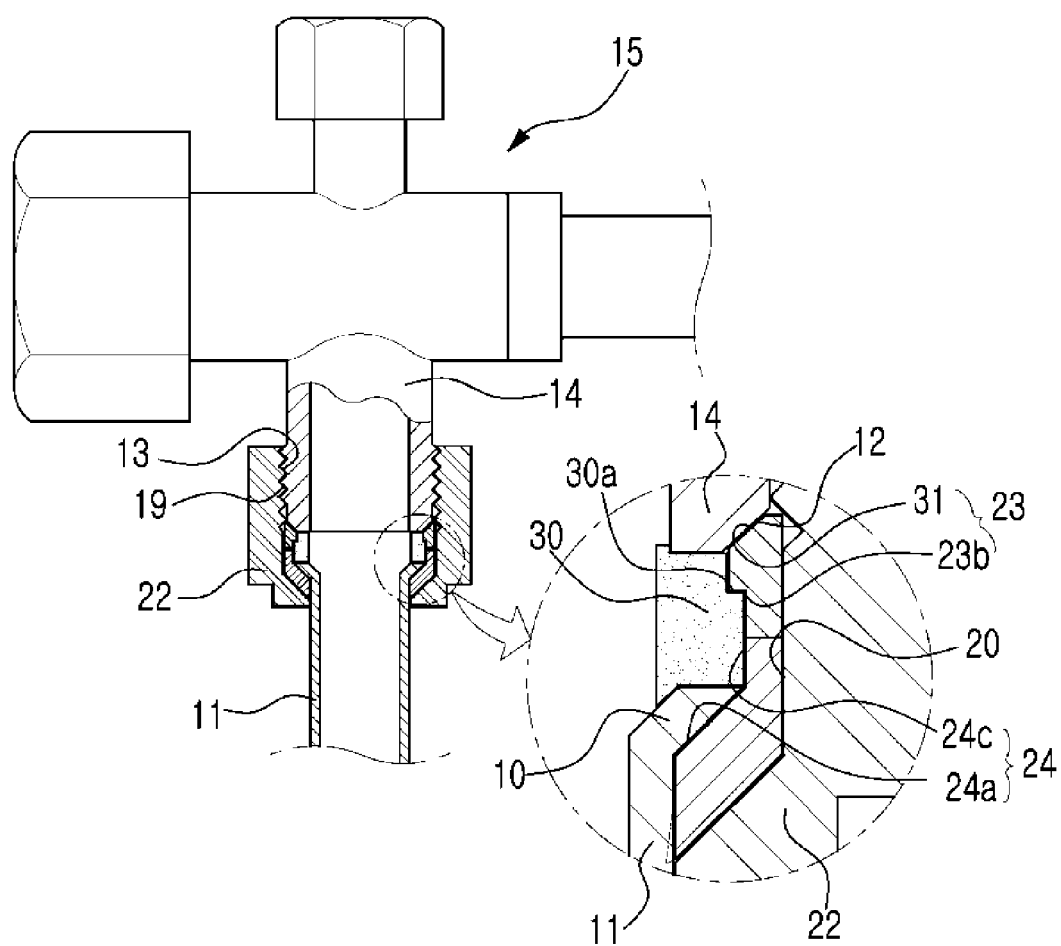
FIG. 2 is a sectional view of the pipe connector shown in FIG. 1.

Referring to FIGS. 1 and 2, a resin-coated aluminum pipe connector for the outdoor unit of an air conditioner according to an embodiment of the present specification includes:

a refrigerant pipe 11 made of aluminum Al, and configured such that an expanded portion 10 is formed at one end thereof (a coating layer made of copper is formed on the outer circumference of the refrigerant pipe 11);

a service valve 15 for an outdoor unit including a connection port 14 in which a first inclined surface 12 is formed at an end of the connection port 14 and a first screw portion 13 is formed on the outer circumference of the connection port 14;

a first compression ring 23 configured such that an inclined surface 31 corresponding to the first inclined surface 12 is formed at one end of the inner circumference thereof and a first stop protrusion 23b is formed at the other end of the inner circumference thereof;

a second compression ring 24 configured such that a second-first inclined surface 24a corresponding to the expanded portion 10 is formed on the inside thereof and a receiving side wall 24c extends upward from the second-first inclined surface 24a;

a sealing material 30 configured such that a second stop protrusion 30a corresponding to the first stop protrusion 23b is formed on the outer circumference thereof, the lower end thereof is received inside the receiving side wall 24c, the gap between the contact surfaces of the first and second compression rings 23 and 24 is sealed, and the sealing material 30 prevents the first and second compression rings 23 and 24 and the expanded portion 10 of the refrigerant pipe 11 from coming into contact with each other (as an example, the sealing material 30 may be made of a Teflon material that elastically deforms when compressed); and a fastener 22 configured such that a second screw portion 19 corresponding to the first screw portion 13 is formed on the entrance side of the inner circumference thereof and a seating portion 20, inside which the first and second compression rings 23 and 24 are seated, is formed beneath the second screw portion 19.

According to the resin-coated aluminum pipe connector for the outdoor unit of an air conditioner according to the embodiment of the present specification, which has the above-described configuration, when the refrigerant pipe 11 having the expanded portion 10 formed at the end thereof is connected to the service valve 15 for an outdoor unit in an airtight state by using the fastener 22 in which the first and second compression rings 23 and 24 are seated on the seating portion 20 as shown in FIGS. 1 and 2, it may be possible to prevent galvanic corrosion attributable to the mutual contact between the expanded portion 10 of the refrigerant pipe 11 made of an aluminum material and the first and second compression rings 23 and 24 made of brass, which are made of heterogeneous materials.

In greater detail, the refrigerant pipe 11 having the expanded portion 10 formed at the end thereof is passed through the fastener 22 so that the expanded portion 10 is brought into tight contact with the second-first inclined surface 24a of the second compression ring 24 and the second compression ring 24 is seated on the seating portion 20 of the fastener 22.

The inclined surface 31 of the first compression ring 23 formed in accordance with the first inclined surface 12 is brought into contact with the first inclined surface 12 formed at the end of the connection port 14 of the service valve 15, and the second stop protrusion 30a of the sealing material 30 formed in accordance with the first stop protrusion 23b is brought into contact with the first stop protrusion 23b formed on the inner circumference of the first compression ring 23.

When the first compression ring 23 to which the sealing material 30 is coupled is seated on the seating portion 20 of the fastener 22, the lower end of the sealing material 30 is received inside the receiving side wall 24c of the second compression ring 24.

Accordingly, when the second screw portion 19 of the fastener 22 formed in accordance with the first screw portion 13 is screwed to the first screw portion 13 of the service valve 15, the sealing material 30 made of a Teflon material is elastically deformed.

As described above, the refrigerant pipe 11 may be connected to the connection port 14 of the service valve 15 in an airtight state by screwing the fastener 22 to the service valve 15.

In other words, when the corresponding second screw portion 19 of the fastener 22 is screwed to the first screw portion 13 of the service valve 15, the inclined surface 31 of the first compression ring 23 comes into tight contact with the first inclined surface 12 of the connection port 14 so that the gap is primarily seated, the second-first inclined surface 24a of the second compression ring 24 comes into contact with the expanded portion 10 of the refrigerant pipe 11 so that the gap is secondarily sealed, and the bottom surface of the connection port 14 and the top surface of the sealing material 30 come into tight contact with each other so that the gap is tertiarily sealed.

Furthermore, when the second screw portion 19 of the fastener 22 is screwed to the first screw portion 13 of the service valve 15, the end of the second-first inclined surface 24a in close contact with the outer surface of the refrigerant pipe 11 is compressed in the radial direction of the refrigerant pipe 11 (indicated by the imaginary line in FIG. 2) and elastically deformed, thereby compressing the outer circumference of the refrigerant pipe 11. Accordingly, the refrigerant pipe 11 may be prevented from being separated from the fastener 22.

At the same time, the first and second compression rings 23 and 24 and the expanded portion 10 of the refrigerant pipe 11 are blocked from coming into contact with each other by the sealing material 30. Accordingly, it may be possible to prevent galvanic corrosion attributable to the contact between the heterogeneous materials when the first and second compression rings 23 and 24 made of brass and the expanded portion 10 of the refrigerant pipe 11 made of aluminum come into close contact with each other.

Meanwhile, when the fastener 22 is coupled and fastened to the connection port 14 of the service valve 15, the first and second compression rings 23 and 24 made of brass and seated on the seating portion 20 of the fastener 22 come into close contact, and thus the sealing material 30 made of Teflon material is prevented from being damaged because excessive compressive force is applied (being broken because excessive compressive force is applied).

As described above, in the refrigerant pipe connector for the outdoor unit of an air conditioner according to the embodiment of the present specification, when the fastener 22 in which the first and second compression rings 23 and 24 are seated on the seating portion 20 is fastened to the connection port 14 of the service valve 15, the sealing material 30 is elastically deformed between the connection port 14 of the service valve 15 and the expanded portion 10 of the refrigerant pipe 11 and, thus, the gap between the first and second compression rings 23 and 24 is sealed, and the first and second compression rings 23 and 24 and the expanded portion 10 of the refrigerant pipe 11 are blocked from coming into contact with each other and, thus, galvanic corrosion attributable to the contact between the heterogeneous materials is prevented.

Figure 3:
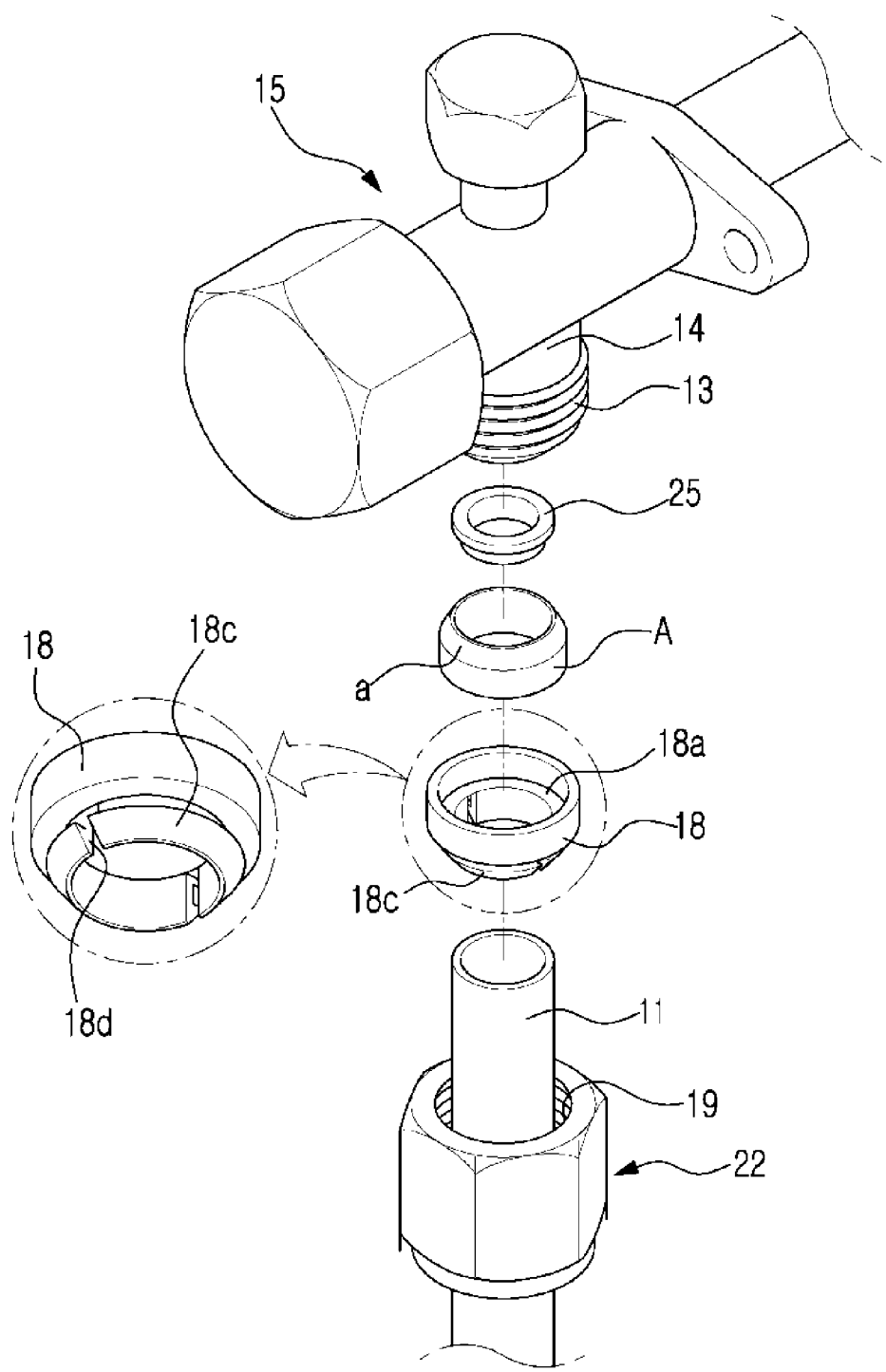
FIG. 3 is a schematic diagram of a resin-coated aluminum pipe connector for the outdoor unit of an air conditioner according to another embodiment of the present specification.
Figure 4:
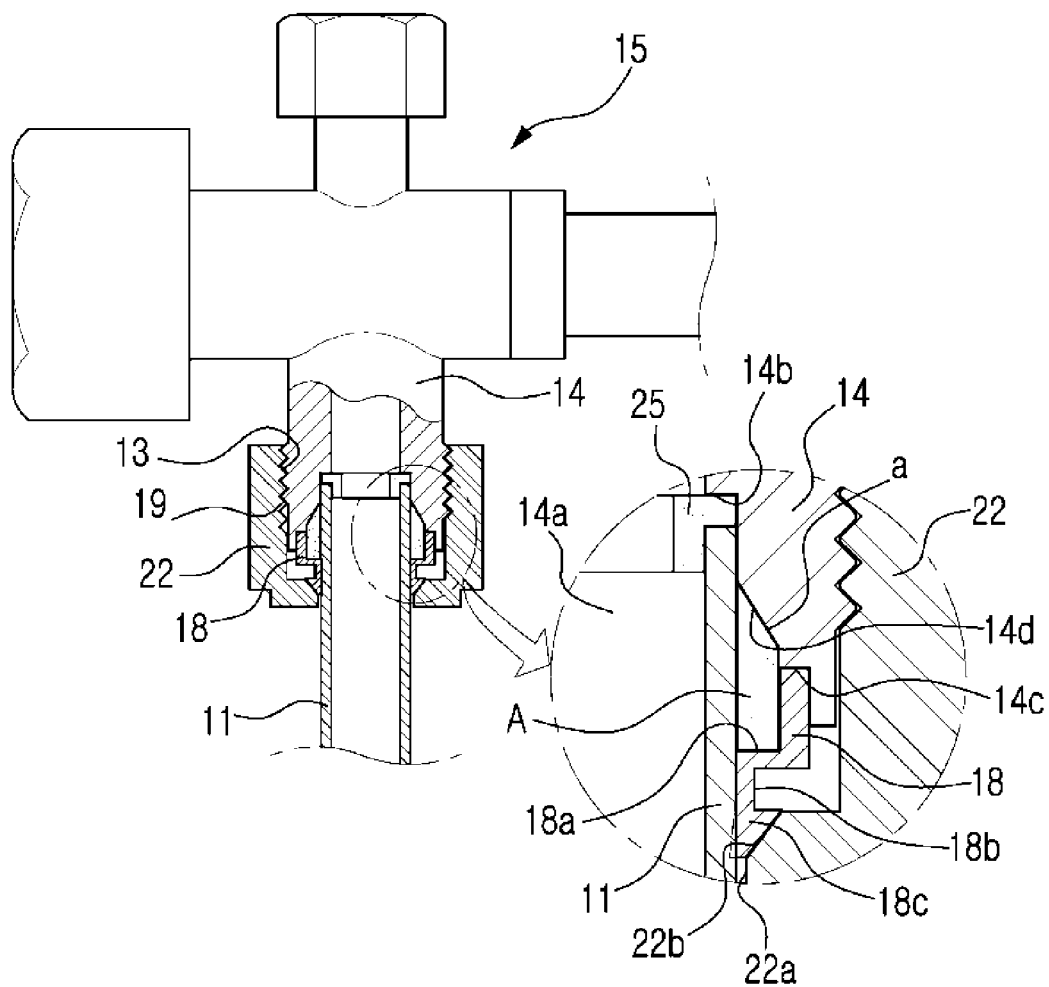
FIG. 4 is a sectional view of the pipe connector shown in FIG. 3.

As shown in FIGS. 3 and 4, a resin-coated aluminum pipe connector for the outdoor unit of an air conditioner according to another embodiment of the present specification includes:

a refrigerant pipe 11 made of aluminum and configured such that refrigerant gas for an air conditioner flows therethrough (a coating layer of copper is formed on the outer circumference of the refrigerant pipe 11);

a service valve 15 for an outdoor unit including a connection port 14 configured such that a first stop protrusion 14b is formed outside a center through hole 14a, an inclined surface 14d is formed at the outer end of the first stop protrusion 14b, a second stop protrusion 14c is formed on the outer end of the inclined surface 14d, and a first screw portion 13 is formed on the outer circumference thereof;

a first compression ring A configured such that an inclined surface 'a' corresponding to the inclined surface 14d of the service valve 15 is formed at one end of the outer circumference thereof and the first compression ring A is elastically deformed when compressed and seals the gap between the refrigerant pipe 11 and the connection port 14 (as an example, the first compression ring A may be made of Teflon material that elastically deforms when compressed);

a second compression ring 18 configured such that it is made of brass, a stop protrusion 18a on which the first compression ring A is seated is formed on the inner circumference thereof, a groove 18b is formed in the outer circumference thereof so that the compression ring 18 can be easily deformed when compressed, a pressing piece 18c is formed at the lower end of the groove 18b and is elastically deformed in a radial direction on the outer circumference of the refrigerant pipe 11 when compressed to prevent the refrigerant pipe 11 from being separated from the fastener 22, and the upper end of the second compression ring 18 is seated on the second stop protrusion 14c of the service valve 15; and a fastener 22 configured such that a second screw portion 19 corresponding to the first screw portion 13 is formed on the entrance side of the inner circumference thereof, a through hole 22a through which the refrigerant pipe 11 passes is formed thorough the center thereof, and an inclined surface 22b corresponding to the inclined surface of the pressing piece 18c of the second compression ring 18 is formed at the inner end of the through hole 22a.

According to the resin-coated aluminum pipe connector for the outdoor unit of an air conditioner according to the other embodiment of the present specification, which is configured as described above, as shown in FIGS. 3 and 4, the refrigerant pipe 11 is connected to the service valve 15 in an airtight state by using the fastener 22 that is screwed to the service valve 15 for an air conditioner in which the above-described first and second compression rings A and 18 are accommodated.

In greater detail, the first compression ring A is coupled by seating the first compression ring A on the stop protrusion 18a formed on the inner circumference of the second compression ring 18. In this case, the inclined surface 'a' formed at one end of the outer circumference of the first compression ring A is seated on the inclined surface 14d of the service valve 15 in a close contact state, and the upper end of the second compression ring 18 is seated on the second stop protrusion 14c of the service valve 15.

An end of the refrigerant pipe 11 passed through the through hole 22a of the fastener 22 is sequentially passed through the second compression ring 18 and the first compression ring A, is seated on the first stop protrusion 14b of the service valve 15, and the corresponding second screw portion 19 of the fastener 22 is screwed to the first screw portion 13 of the service valve 15.

There is further included a sealing material 25 that is coupled to an end of the above-described refrigerant pipe 11 and has an empty inside (the sealing material 25 is made of a Teflon material that is elastically deformed when compressed). Accordingly, when the fastener 22 is fastened to the connection port 14 of the service valve 15, refrigerant may be prevented from leaking through the gap between an end of the refrigerant pipe 11 and the first stop protrusion 14b of the connection port 14 in a close contact by the sealing material 25 elastically deformed between the end of the refrigerant pipe 11 and the first stop protrusion 14b.

As described above, when the fastener 22 is fastened to the connection port 14 of the service valve 15, the inclined surface 'a' of the first compression ring A (which is made of a Teflon material that is elastically deformed when compressed) that is elastically deformed by the compression of the second compression ring 18 is compressed in a state of being in close contact with the inclined surface 14d of the service valve 15.

As a result, the inclined surface 'a' of the first compression ring A made of a Teflon material is elastically deformed and an end of the inclined surface 'a' burrows into the coating layer applied to the outer circumference of the refrigerant pipe 11 and is compressed. Accordingly, the gap between the outer circumference of the refrigerant pipe 11 and the inclined surface 14d of the service valve 15 is sealed by the first compression ring A, and thus an air tight state may be maintained.

At the same time, when the fastener 22 is fastened to the connection port 14 of the service valve 15, the pressing piece 18c formed on the second compression ring 18 in close contact with the inclined surface 22b is compressed in the radial direction by the inclined surface 22b formed on the inner end of the through hole 22a of the fastener 22.

Accordingly, the end of the inclined surface of the pressing piece 18c is elastically deformed and compressed in the outer circumference of the refrigerant pipe 11 in a radial direction (indicated by the imaginary line in FIG. 4), and thus the refrigerant pipe 11 may be prevented from being separated from the fastener 22.

In this case, the groove 18b is formed in the outer circumference of a cylindrical portion (not shown) formed between the stop protrusion 18a of the second compression ring 18 and the pressing piece 18c. Accordingly, when the fastener 22 is fastened to the connection port 14 of the service valve 15, the compressive force applied to the pressing piece 18c of the second compression ring 18 in the radial direction may be increased.

Accordingly, the elastic deformation amount of the pressing piece 18c of the second compression ring 18 applied to the outer circumference of the refrigerant pipe 11 may be increased.

Furthermore, at least one slot 18d cut in the axial direction is further provided in addition to the above-described groove 18b and pressing piece 18c. When the fastener 22 is fastened to the connection port 14 of the service valve 15, the elastic deformation amount generated in the pressing piece 18c of the second compression ring 18 by the slot 18d may be increased.

Although the above-described specification has been described with reference to the preferred embodiments, it will be understood that those skilled in the art may variously modify and alter the present specification without departing from the spirit and scope of the present specification described in the following claims.

INDUSTRIAL APPLICABILITY

According to the present invention having the above-described configuration, when the refrigerant pipe is connected to the service valve for the outdoor unit of an air conditioner in a sealed state by a one-touch method, the effect of being effectively utilized is achieved.

The invention claimed is:

1. A resin-coated aluminum pipe connector for an outdoor unit of an air conditioner, the resin-coated aluminum pipe connector comprising:
a resin-coated refrigerant pipe made of aluminum, and configured such that an expanded portion is formed at one end thereof;
a service valve including a connection port in which a first inclined surface is formed at an end of the connection port and a first screw portion is formed on an outer circumference of the connection port;
a first compression ring made of brass, and configured such that an inclined surface corresponding to the first inclined surface is formed at a top end thereof;
a second compression ring made of brass, and configured such that a second-first inclined surface corresponding to the expanded portion is formed on an inside thereof and a receiving side wall extends upward from the second-first inclined surface; and
a fastener configured such that a second screw portion corresponding to the first screw portion is formed on an entrance side of an inner circumference thereof and a seating portion, inside which the first and second compression rings are seated, is formed beneath the second screw portion,
wherein the resin-coated aluminum pipe connector further comprises a sealing material configured such that a stop protrusion on which the first compression ring is seated is formed on an outer circumference thereof and a lower end thereof is received inside the receiving side wall, such that the sealing material prevents the expanded portion from being broken due to an excessive amount of compressive force applied to the expanded portion as contact surfaces of the first and second compression rings of brass seated on the seating portion of the fastener come into close contact with each other when the fastener is engaged with the connection port of the service valve, such that the sealing material seals a gap between contact surfaces of the service valve and the first compression ring, a gap between contact surfaces of the expanded portion and the second compression ring, and a gap between the contact surfaces of the first and second compression rings, and such that the sealing material prevents a top surface of the expanded portion of the resin-coated refrigerant pipe made of aluminum from coming into direct contact with the service valve made of brass and the first and second compressing rings made of brass; and wherein, when the second screw portion of the fastener is engaged with the first screw portion of the service valve, a lower end of an inner circumference of the second compression ring radially compresses an outer circumference of the resin-coated refrigerant pipe in close contact with the inner circumference of the second compression ring, thereby preventing the resin-coated refrigerant pipe from being separated from the fastener.

\* \* \* \* \*